W. W. WOTHERSPOON.
SEAL FOR CONDUITS.
APPLICATION FILED APR. 23, 1912. RENEWED AUG. 13, 1918.

1,294,744.

Patented Feb. 18, 1919.

Attest:

Inventor:
W. W. Wotherspoon
by Rogers, Kennedy & Campbell Attys.

UNITED STATES PATENT OFFICE.

WILLIAM WALLACE WOTHERSPOON, OF NEW YORK, N. Y.

SEAL FOR CONDUITS.

1,294,744.  Specification of Letters Patent.  Patented Feb. 18, 1919.

Application filed April 23, 1912, Serial No. 692,716. Renewed August 13, 1918. Serial No. 249,721.

*To all whom it may concern:*

Be it known that I, WILLIAM WALLACE WOTHERSPOON, a citizen of the United States, residing at New York, in the county of New York and State of New York, have invented certain new and useful Improvements in Seals for Conduits, of which the following is a specification, reference being had therein to the accompanying drawing.

In the installation of electric systems in ships, it is the practice to extend the conduits for carrying the conductors or wires, along the inner sides of the hull of the vessel. In this position the conduits extend in many cases through water-tight compartments separated from each other by partitions or bulk heads, the conduits extending through the separating partitions and being sealed therein so as to prevent the leakage of water between the compartments around the conduits. It is the practice to provide the conduit with junction boxes through which access may be had from the compartments to the interior of the conduit, which junction boxes are usually provided with lids or covers which may not be fitted sufficiently tight to prevent the entrance of water under the conditions described. In the event of leakage of water into one of the compartments, it will find its way through the junction box therein into the interior of the conduit, and the water will flow through the other junction boxes into the other compartments, thereby flooding the entire series of compartments through which the conduit extends. This will result not only in serious injury to the conductors and the disability of the entire system, but may cause a serious listing or even sinking of the vessel.

It is the aim of the present invention to avoid these objectionable conditions, and to this end my invention consists in the provision of a filling for the conduit, of such character that it will form a local seal across the interior of the same, these fillings being arranged in the conduit between the junction boxes or similar openings, with the result that if there is a leakage in one compartment, the water entering the conduit through any exposed opening, will be checked by the fillings in the other compartments and be prevented from flooding the same.

I prefer to employ some material for the filling which may be conveniently introduced into the conduit, which when introduced will form a solid sealing plug, and which, when there is occasion to remove or insert the conductors, may be conveniently removed from the conduit, and I have found paraffin to be a satisfactory material answering these conditions. The paraffin may be introduced in liquid form through a hole in the side of the conduit, and hardening therein, will produce a solid filling or sealing plug closely surrounding and embedding the conductors. It is manifest, however, that other materials may be employed for this purpose, and that other means may be resorted to to effect the local sealing of the interior of the conduit, without departing from the limits of my invention. It will be understood, therefore, that my invention is not limited to any particular form or construction of the parts except in so far as such limitations are specified in the claims.

Figure 1:
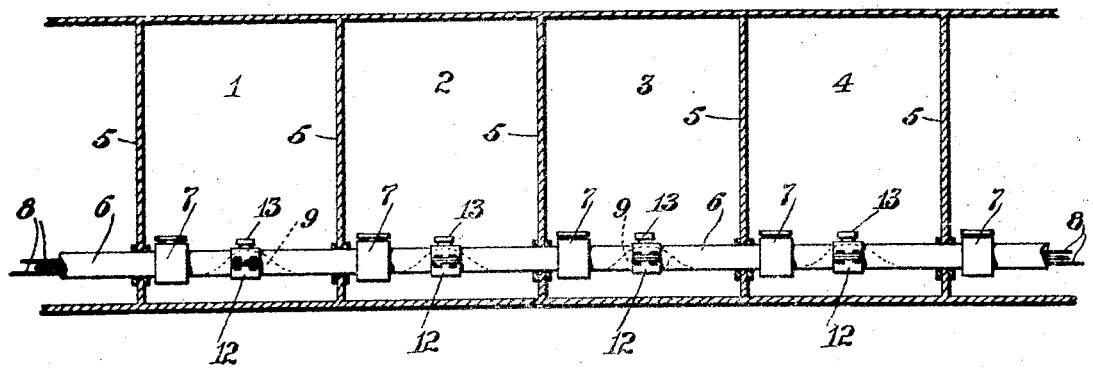
Figure 1 is a sectional elevation of a number of water-tight compartments showing a conduit extending therethrough, and having my invention applied thereto.
Figure 2:
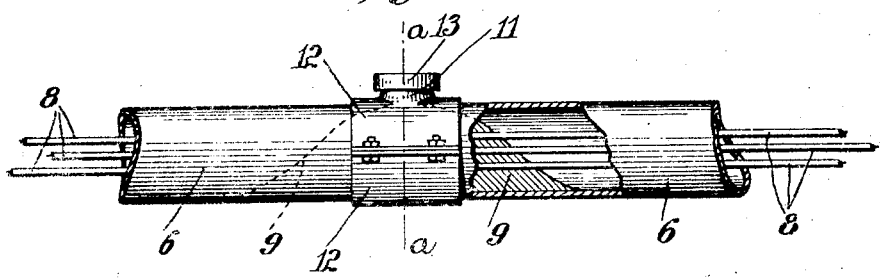
Fig. 2 is an elevation on an enlarged scale of a section of the conduit showing the same provided with a hole and pouring funnel for the introduction of the filling.
Figure 3:
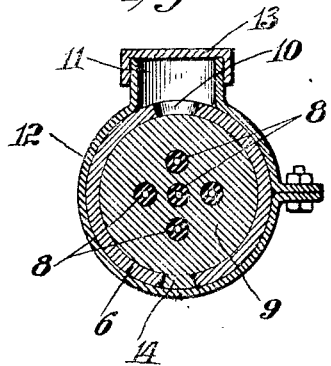
Fig. 3 is a transverse section on the line *a—a* of Fig. 2.

Referring to the drawings, 1, 2, 3 and 4 represent a number of adjoining water-tight compartments separated by bulk heads or partitions 5, 5, 5, etc., and 6 represents a conduit extending horizontally through the several compartments and through the partitions between them, which conduit is sealed as usual in the partitions to prevent the leakage of water from one compartment to the next around the conduit. The conduit is as usual provided in each compartment with an opening for permitting access to its interior, such as a junction box 7, for the purpose of permitting the installation or removal of the conductors 8, or their connection or repair, or for other and similar purposes. The junction boxes are usually closed by lids, which, however, as a rule are not fitted sufficiently tight to exclude water, hence if one of the compartments is flooded, as by injury thereto or otherwise, the water will find its way into the conduit through the junction box, and from the conduit will escape into the other compartments and flood them as well as the entire conduit. To prevent this condition, I provide in the conduit at suitable intervals, fillings or plugs 9, of such form that the filling will close the interior of the conduit and form a local seal across the same. This filling is shown as closely surrounding and embedding the conductors within it, and as completely filling the cross-sectional area of the conduit, but extending only a short distance lengthwise thereof. As before stated, it is preferable to form the filling of a material which will admit of its convenient introduction into the conduit, as well as its removal therefrom, in the event of its being desired to remove the conductors or to introduce additional ones. I employ as satisfactory for this purpose, a material which will liquefy or melt on the application of a moderate degree of heat, such for instance as paraffin. In forming the filling of paraffin it is introduced in melted form through a hole or opening 10 in the side of the conduit, with the result that it will spread out in the conduit in a mass, and quickly hardening at the ends will pile up in the form of a solid filling, extending entirely across the interior of the conduit and a slight distance lengthwise thereof, as shown in dotted lines (Fig. 2) and in full lines (Fig. 3), and will closely surround and embed the conductors within it. In order to provide for the convenient introduction of the filling and to produce a finished appearance of the conduit at the point of introduction, I provide a pouring funnel 11, which surrounds the hole 10 and is carried by a sleeve or collar 12, detachably clamped around the conduit, this funnel being provided with a cover or cap 13, to close the same. To permit the removal of the filling, a second hole or opening 14 is formed in the conduit opposite the other opening, through which, after the sleeve has been slipped along the conduit to expose it, and after a moderate degree of heat has been applied, the liquid paraffin will escape.

While I have shown and described my invention as being peculiarly applicable in connection with electric installation for ships, where the conduit passes through water-tight compartments, it will be understood that the invention is applicable as well to other environments, and in fact wherever there may be occasion to provide a local seal or filling across the interior of the conduit.

Having thus described my invention, what I claim is:

1. In combination with a conduit having opposite peripheral openings, a liquefiable filling in said conduit adapted to be introduced through one opening and discharged through the other, and a collar encircling the conduit and covering the latter opening and formed with a funnel communicating with the other opening.

2. In combination with a partition separating adjoining compartments, a conduit extending in said compartments and sealed water-tight in the partition, said conduit having openings for access therein from the respective compartments, and solid local fillings located in the conduit at points between the said openings, said fillings sealing the interior of the conduit.

3. In combination with a plurality of partitions separating adjoining compartments, a conduit extending through said compartments and sealed water-tight in the partitions and having upper and lower peripheral openings situated in each compartment, junction boxes applied to the conduit, and spaced solid fillings of a liquefiable material in said conduit, the said fillings embedding the conductor at intervals corresponding to the location of the openings, and said fillings forming local seals extending across the interior of the conduit to prevent the passage of water therethrough, and adapted to be introduced through the upper openings and discharged through the lower openings.

In testimony whereof I affix my signature in presence of two witnesses.

WILLIAM WALLACE WOTHERSPOON.

Witnesses:
M. FRIEDMAN,
C. I. NIELSEN.